(12) United States Patent
Waletzek et al.

(10) Patent No.: US 8,826,646 B2
(45) Date of Patent: Sep. 9, 2014

(54) FLUID DELIVERY DEVICE

(75) Inventors: Christoph Waletzek, Stuttgart (DE); Peter Holek, Murrhardt (DE); Ralph Schmidt, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 487 days.

(21) Appl. No.: 12/753,396

(22) Filed: Apr. 2, 2010

(65) Prior Publication Data
US 2010/0251715 A1  Oct. 7, 2010

(30) Foreign Application Priority Data

Apr. 2, 2009  (DE) .................. 10 2009 002 148

(51) Int. Cl.
  *F01N 3/00* (2006.01)
  *F04B 35/04* (2006.01)
  *F01N 3/20* (2006.01)

(52) U.S. Cl.
  CPC ........... *F04B 35/045* (2013.01); *F01N 2610/02* (2013.01); *F01N 3/2066* (2013.01); *F01N 2610/1433* (2013.01)
  USPC ............... 60/286; 60/295; 60/301; 417/212; 417/218; 417/413.1; 310/14

(58) Field of Classification Search
  USPC .......... 60/274–324; 310/14, 23, 12.01–12.33; 417/410.1, 412, 413.1
  See application file for complete search history.

(56) References Cited

U.S. PATENT DOCUMENTS

| | | | | |
|---|---|---|---|---|
| 2,254,495 A | * | 9/1941 | Randolph et al. ............... | 310/34 |
| 3,186,349 A | * | 6/1965 | Compton ..................... | 417/470 |
| 3,333,547 A | * | 8/1967 | Compton et al. ............. | 417/471 |
| 3,999,899 A | * | 12/1976 | Sakai et al. ................... | 417/471 |
| RE29,333 E | * | 8/1977 | Pensa ............................ | 417/216 |
| 4,137,020 A | * | 1/1979 | Ito et al. ........................ | 417/534 |
| 4,793,311 A | * | 12/1988 | Salzgeber et al. ............ | 123/450 |
| 4,874,299 A | * | 10/1989 | Lopez et al. ............... | 417/413.1 |
| 5,104,298 A | * | 4/1992 | Takahashi et al. ............ | 417/415 |
| 5,246,353 A | * | 9/1993 | Sohn ........................ | 417/413.1 |
| 5,360,323 A | * | 11/1994 | Hsieh ........................ | 417/413.1 |
| 5,719,451 A | * | 2/1998 | Cook et al. ................. | 310/12.27 |
| 5,809,157 A | * | 9/1998 | Grumazescu ................ | 381/412 |
| 6,323,568 B1 | * | 11/2001 | Zabar ............................ | 310/17 |
| 6,514,047 B2 | * | 2/2003 | Burr et al. ...................... | 417/53 |
| 6,544,005 B2 | * | 4/2003 | Wade ............................ | 417/233 |
| 2008/0236147 A1 | * | 10/2008 | Van Vuuren et al. ........... | 60/295 |
| 2009/0125004 A1 | * | 5/2009 | Shen et al. .................... | 604/543 |

FOREIGN PATENT DOCUMENTS

| | | | |
|---|---|---|---|
| DE | 4119228 A1 | 12/1992 | |
| JP | 62099684 A | * 5/1987 | ............. F04B 43/04 |
| WO | 2005024232 A1 | 3/2005 | |

* cited by examiner

*Primary Examiner* — Jesse Bogue

(74) *Attorney, Agent, or Firm* — Maginot, Moore & Beck

(57) ABSTRACT

A fluid delivery device, in particular for delivering exhaust gas posttreatment media, such as a urea-water solution, for an internal combustion engine, includes a movable work wall, in particular a work diaphragm. A work chamber is provided for a fluid that is to be delivered via at least one fluid connection. The work chamber is capable of being increased and decreased in size by means of the movable work wall, the at least one fluid connection, and at least one mechanism for moving the work wall upon an intake stroke and a compression stroke. The at least one mechanism is embodied such that the force for moving the work wall both in the intake stroke and in the compression stroke includes a Lorentz force.

21 Claims, 7 Drawing Sheets

FLUID DELIVERY DEVICE

CROSS-REFERENCE TO RELATED APPLICATION

This application is based on German Patent Application 10 2009 002 148.5 filed Apr. 2, 2009.

BACKGROUND OF THE INVENTION

1. Field of the Invention

The invention relates to a fluid delivery device, a system for feeding an exhaust gas posttreatment medium, and a motor vehicle.

2. Description of the Prior Art

Fluid delivery devices are used for the most various technical applications. In systems for feeding an exhaust gas posttreatment medium, such as a urea-water solution, into an exhaust line of an internal combustion engine, fluid delivery devices are necessary for delivering the exhaust gas posttreatment medium from an exhaust gas posttreatment medium reservoir to an injection valve for introducing the exhaust gas posttreatment medium into the exhaust line of the engine. With the exhaust gas posttreatment medium injected, pollutants in the exhaust gas of the engine are intended to be reduced in a downstream catalytic converter. The fluid delivery device pumps the exhaust gas posttreatment medium from the reservoir to the injection valve. The fluid delivery device, such as a diaphragm pump, is driven by a crank drive, for example. The fluid delivery device pumps the exhaust gas posttreatment medium to the injection valve continuously.

International patent disclosure WO 2005/024232 A1 shows a fluid delivery device of this generic type in the form of a diaphragm pump. A magnet coil is embedded in a housing. An axially movable cup-shaped piston is disposed in a bushlike slide bearing of the housing. One end of the piston is braced against a compression spring. A pump chamber is formed by an indentation of a pump head, and the pump chamber is defined on one side by a diaphragm. The diaphragm, on the side toward the piston, has an extension which penetrates a central bore in the piston. By means of two check valves, the fluid to be delivered can be introduced into and carried out of the pump chamber. When current is supplied to the magnet coil, the piston is displaced counter to the force of the compression spring until the piston rests with its flange on a set screw. In the process, the diaphragm, since it is axially solidly connected to the piston, is entrained with the piston, and as a result, the diaphragm generates an under pressure in the pump chamber. Fluid is thereby aspirated into the pump chamber. After the current supply to the magnet coil is shut off, the piston moves back by the force of the compression spring until it comes with its flange into contact with a shoulder face of the pump housing. In this axial displacement motion, the diaphragm is entrained and elastically deformed, and the fluid to be pumped that is located in the pump chamber is put under pressure, so that the fluid to be delivered is pumped out of the pump chamber by a check valve embodied as an outlet valve. The diaphragm pump is disadvantageously poorly controllable and requires the compression spring, since the magnet coil is able to generate a force in only one direction.

From German Patent DE 41 19 228 C2, a diaphragm pump of this generic type is known. A work chamber is formed by a dome-shaped pump chamber wall and by an elastic work diaphragm that is fastened in the pump housing. The work diaphragm is moved by a crank drive.

ADVANTAGES AND SUMMARY OF THE INVENTION

A fluid delivery device according to the invention, in particular for delivering exhaust gas posttreatment media, such as a urea-water solution, for an internal combustion engine, includes a movable work wall, in particular a work diaphragm, a work chamber for a fluid that is to be delivered, the work chamber being capable of being increased and decreased in size by means of the movable work wall, at least one fluid connection for a fluid that is to be delivered, and at least one mechanism for moving the work wall upon an intake stroke and a compression stroke, in which the at least one mechanism is embodied such that the force for moving the work wall both in the intake stroke and in the compression stroke includes a Lorentz force.

In a further feature, the movable work wall is a work piston.

The Lorentz force is thus employed both in the intake stroke and in the compression stroke for moving the work wall. Thus no spring, for example, is necessary for moving the work wall in the intake stroke or the compression stroke, and furthermore, only a few mechanical parts are needed for moving the work wall.

In particular, the force for moving the work wall both in the intake stroke and in the compression stroke is solely the Lorentz force.

In a further feature, the at least one mechanism includes a movable coil through which alternating current flows, and the coil is operatively connected to the work wall.

In an expanded embodiment, the at least one mechanism includes a permanent magnet, and/or the coil is disposed in a magnetic field generated by the permanent magnet.

In a further feature, the magnetic field is generated by an electromagnet.

The at least one mechanism includes an iron core or an iron part, and the magnetic field generated by the permanent magnet is passed through the iron core or the iron part, in particular in the form of an iron return, for concentrating the magnetic flux.

In a variant, the movable coil is connected to at least one elastic element, such as a spring, and the at least one elastic element is connected to the movable coil and to a stationary part of the fluid delivery device.

Expediently, the coil is mechanically coupled to the work wall, preferably by means of a rod.

In a further embodiment, the coil is mechanically connected to the at least one work wall by means of a stepped-up coupling.

In particular, the coil is coupled hydraulically to the at least one work wall.

In a further feature, the coil is coupled to the at least one work wall by means of a mechanism, in particular a lever mechanism.

In an expanded variant, the coil is coupled to the work wall by means of a spring, in particular a leaf spring.

In a further variant, the fluid delivery device includes a first fluid connection to the work chamber having a valve for introducing the fluid into the work chamber and a second fluid connection to the work chamber having a valve for carrying the fluid out of the work chamber.

In a further feature, the work wall at least partly comprises plastic.

A system according to the invention for feeding an exhaust gas posttreatment medium, such as a urea-water solution, into an exhaust line of an internal combustion engine, preferably includes an internal combustion engine, preferably the exhaust line, an injection valve for introducing the exhaust gas posttreatment medium into the exhaust line, a reservoir for the exhaust gas posttreatment medium, a fluid delivery device, and at least one line for carrying the exhaust gas posttreatment medium from the reservoir into the exhaust line by means of the fluid delivery device, in which the fluid delivery device is embodied in accordance with a fluid delivery device described herein.

A motor vehicle according to the invention includes a fluid delivery device, described herein, and/or a system, described herein, for feeding an exhaust gas posttreatment medium, such as a urea-water solution, into an exhaust line of an internal combustion engine.

BRIEF DESCRIPTION OF THE DRAWINGS

The invention will be better understood and further advantages thereof will become more apparent from the ensuing detailed description of preferred embodiments taken in conjunction with the drawings, in which.

DESCRIPTION OF THE PREFERRED EMBODIMENTS

Figure 1:
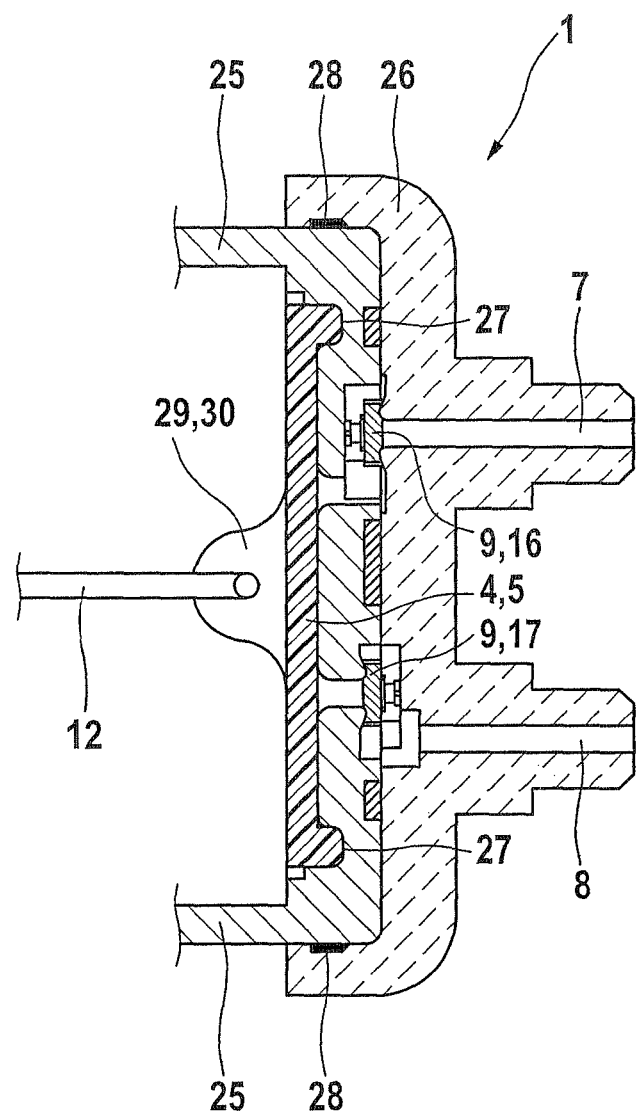
FIG. 1 is a schematic longitudinal section through a fluid delivery device in a first position of a work diaphragm.
Figure 2:
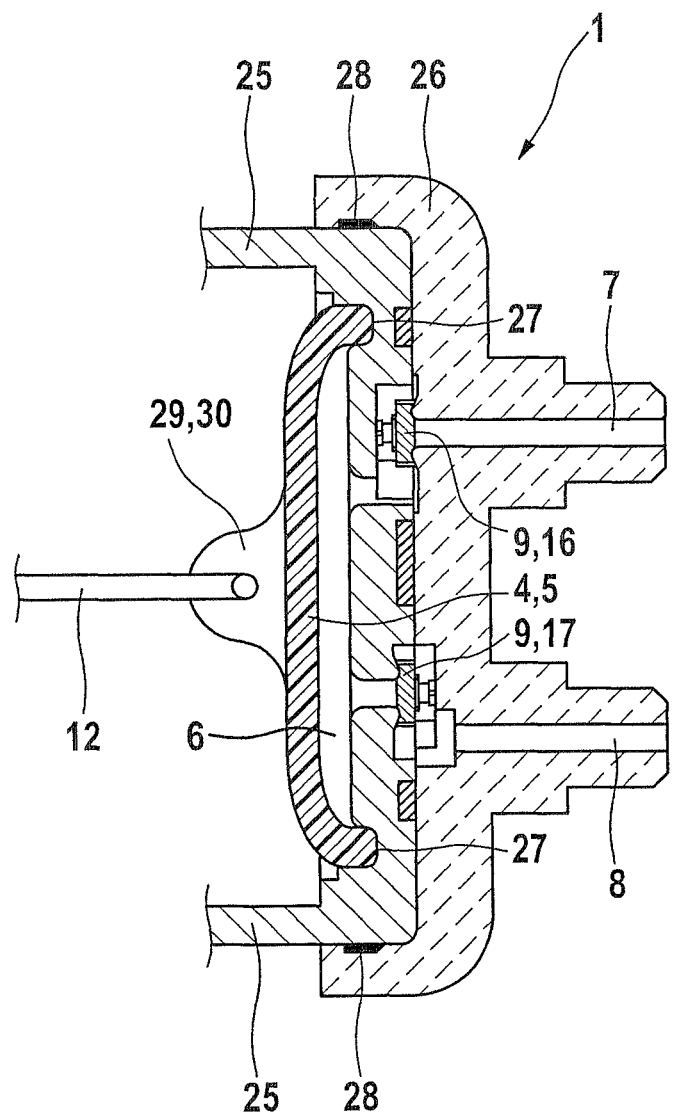
FIG. 2 shows the fluid delivery device of FIG. 1 in a second position of the work diaphragm.
Figure 7:
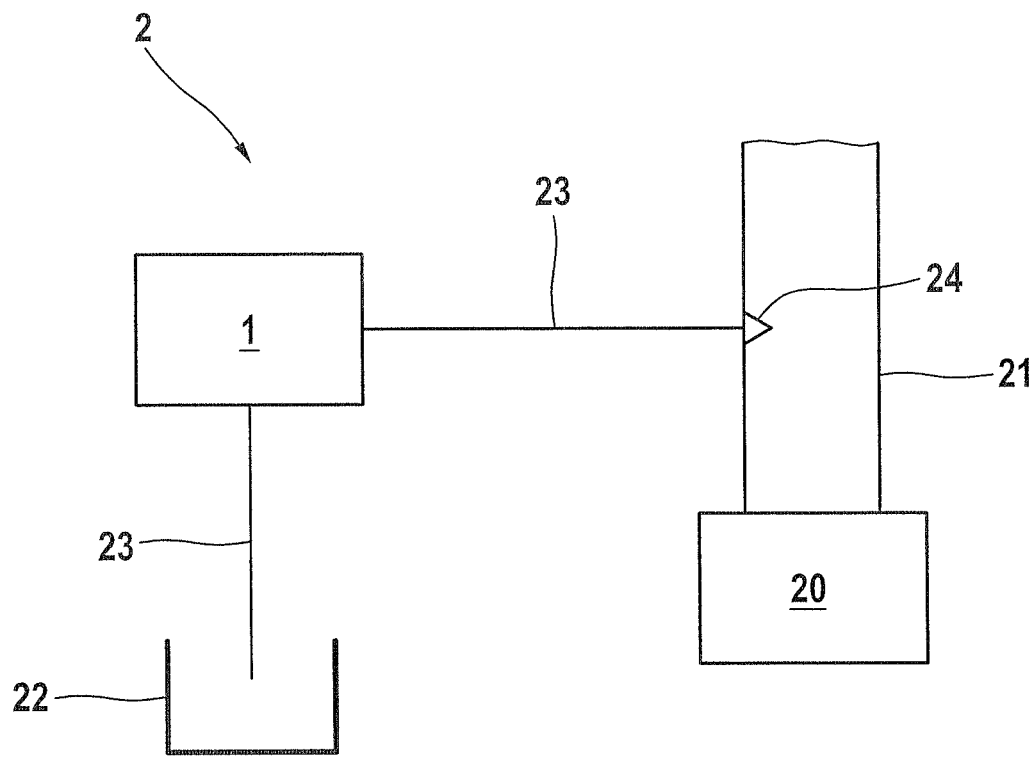
FIG. 7 is a schematic illustration of a system for feeding an exhaust gas posttreatment medium into an exhaust line of an internal combustion engine.

In FIGS. 1, 2, and 7, a longitudinal section is shown through a fluid delivery device 1, in the form of a diaphragm pump, for delivering or pumping an exhaust gas posttreatment medium in a system 2 for feeding an exhaust gas posttreatment medium into an exhaust line 21 of an internal combustion engine 20.

A means 10 for moving a work diaphragm 4 is disposed in a drive housing pot 25 (shown only in part). The means 10 is not shown in FIGS. 1 and 2 and is shown only in FIGS. 3-6. In FIGS. 1 and 2, only a rod 12 is shown, which is connected to a work wall 5, embodied as the work diaphragm 4, by means of an insert 29, embodied as a plug-in insert 30. The rod 12 couples or in other words connects the work diaphragm 4 mechanically to the means 10.

The drive housing pot 25 is closed off by a connection plate 26. The drive housing pot 26, which in cross section is cylindrical, is thus closed in cap like fashion by the connection plate 26. The connection plate 26 comprises plastic that is transparent to and hence to laser light. The drive housing pot 26 comprises laser-absorbing plastic. As a result, in an especially advantageous way, by means of a welding strip 28 between the drive housing pot 25 and the connection plate 26, the connection plate 26 and the drive housing pot 25 can be joined together by means of laser welding. Preferably, the welding strip 28 is also embodied as fluid-tight.

A first fluid connection 7 is embodied in the connection plate 26. In the drive housing pot 25 on the end of the first fluid connection 7, there is also a valve 9, embodied as an inlet check valve 16. Thus the first fluid connection 7 is also present, along with the inlet check valve 16, in the drive housing pot 25. The fluid to be delivered can thus be introduced into a work chamber 6 through the first fluid connection 7. The work chamber 6 is defined on one side by an inner side of the drive housing pot 25 and on the other side by the movable elastic work diaphragm 4. The work diaphragm 4, made of plastic or flexible material, such as rubber, is secured at its ends to an annular groove 27 in the drive housing pot 25. Also, analogously to the first fluid connection 7 and the inlet check valve 16, a second fluid connection 8 is embodied on the connection plate 26. On the drive housing pot 25, there is also a valve 9, embodied as an outlet check valve 17, as well as a corresponding remaining portion of the second fluid connection 8. The inlet check valve 16, with a spring, not shown, and a movable flap, is embodied such that the fluid to be delivered can flow only into the work chamber 6 through the first fluid connection 7, but it cannot flow out of the work chamber 6 through the first fluid connection 7. In the same way, the fluid can flow only out of the work chamber 6 through the second fluid connection 8 with the outlet check valve 17 embodied for that purpose. The inlet and outlet check valves 16, 17 are embodied analogously, with a spring, not shown, and with a movable flap.

In FIG. 2, the fluid delivery device 1 is shown in a second position of the work diaphragm 4. The work diaphragm 4 is located at bottom dead center, so that the work chamber 6 is at its maximum volume. At bottom dead center of the work diaphragm 4 in a first position of the work diaphragm 4, the work chamber 6 is at its minimum volume (FIG. 1). The work diaphragm 4 is moved by the means 10 (FIGS. 3-6). The motion of the work diaphragm 4 in the direction of the second position thus causes an increase in the size of the work chamber 6, so that an under pressure occurs in the work chamber 6 (intake stroke). This incident under pressure acts on the inlet check valve 16, which opens, and which thus opens the first fluid connection 7. As a result, the fluid to be delivered can flow through the first fluid connection 7 into the work chamber 6. During this process, the outlet check valve 17 is closed.

Upon a motion of the work diaphragm 4 into the position shown in FIG. 1, the volume of the work chamber 6 decreases, so that an overpressure occurs in the work chamber 6 (compression stroke). The overpressure causes the inlet check valve 16 to close and the outlet check valve 17 to open. Thus the fluid to be delivered flows out of the work chamber 6 through the second fluid connection 8.

In FIGS. 3-6, four different exemplary embodiments of the means 10 for moving the work diaphragm 4 are shown, in the form of voice coil drives 18. Of the components of the fluid delivery device 1 shown in FIGS. 1 and 2, only the work diaphragm 4 is shown in FIGS. 3, 4, 5 and 6.

Figure 3:
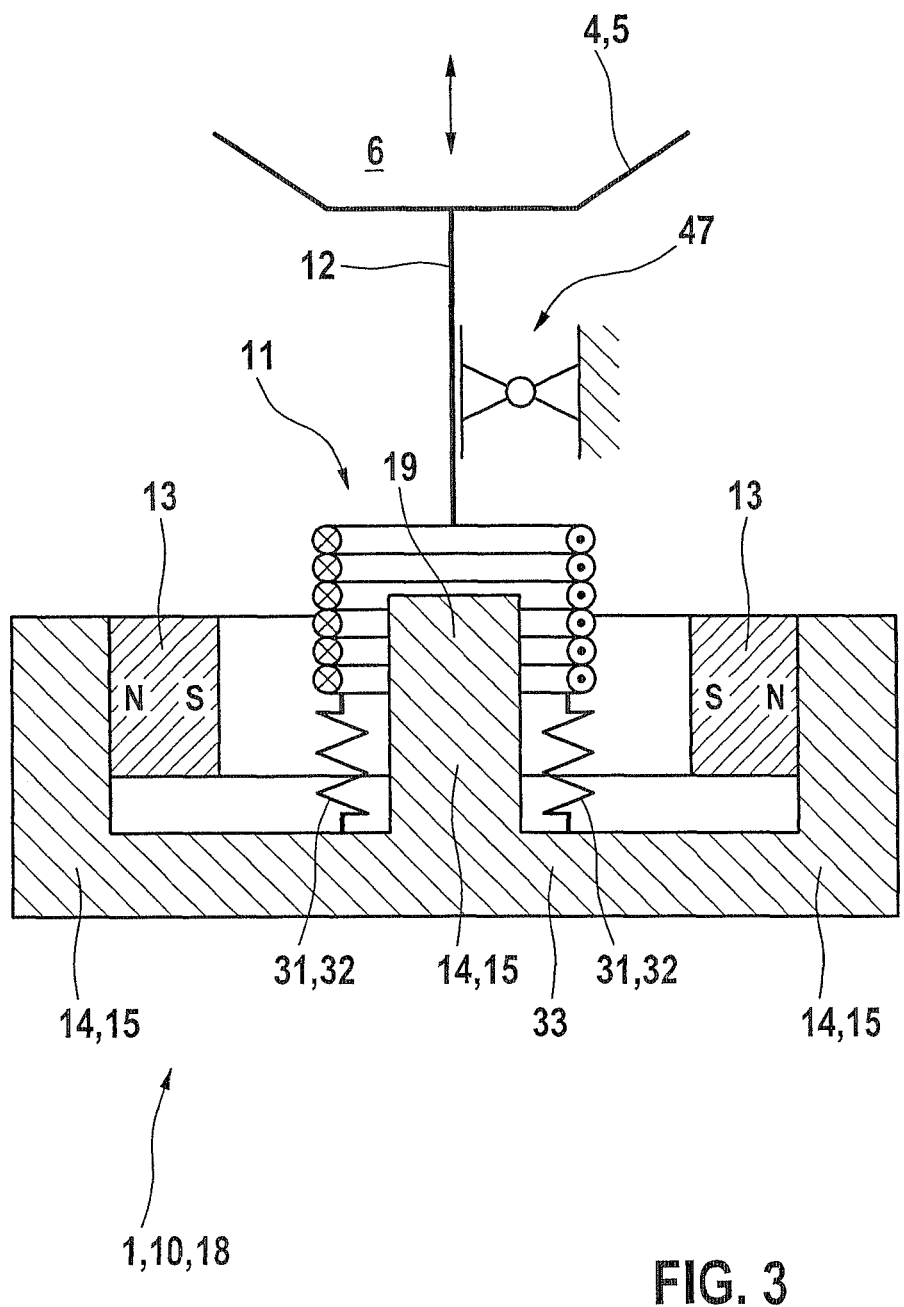
FIG. 3 is a schematic illustration of a mechanism for moving the work diaphragm, in a first exemplary embodiment.
Figure 4:
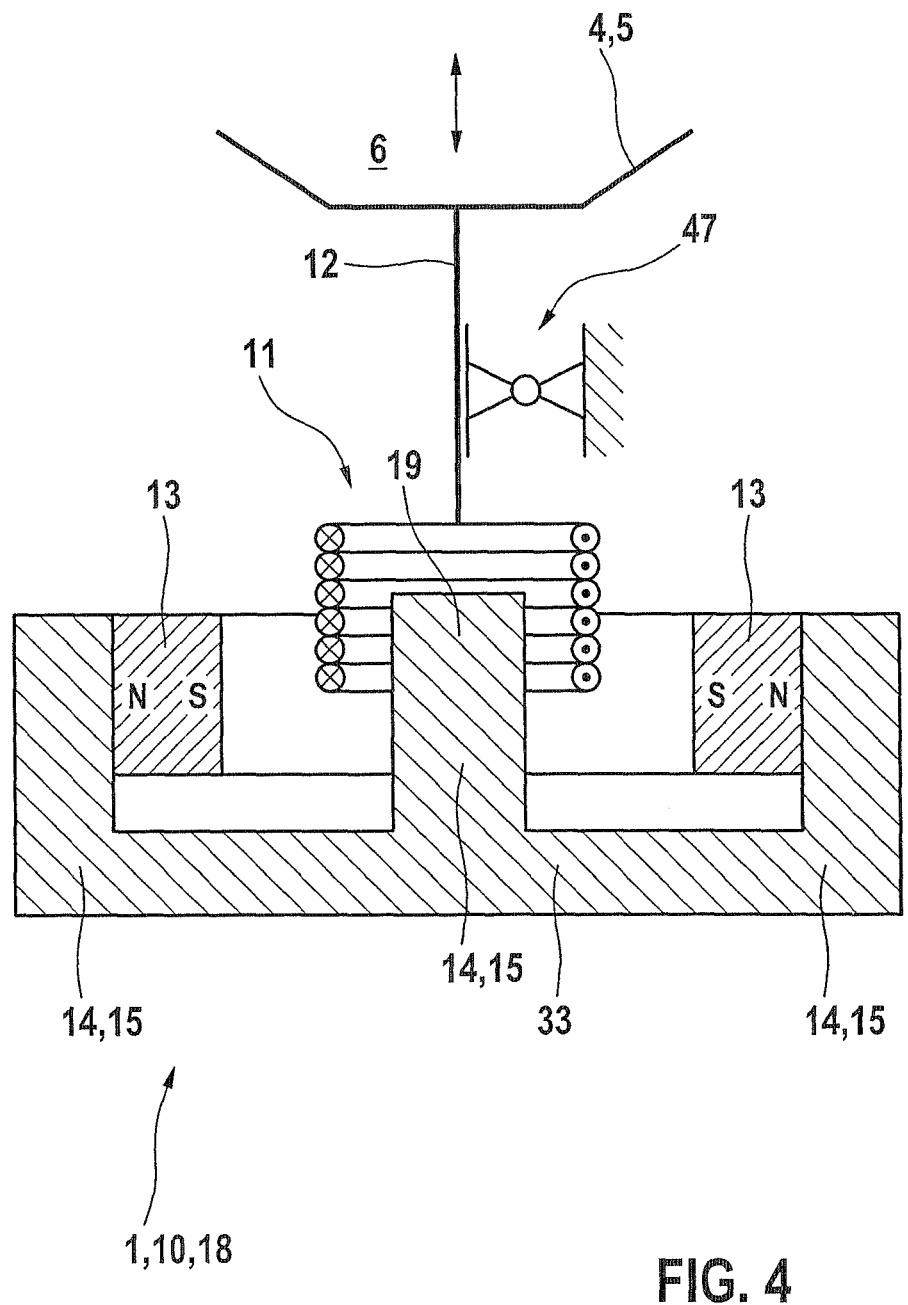
FIG. 4 is a schematic illustration of the mechanism for moving the work diaphragm, in a second exemplary embodiment.
Figure 6:
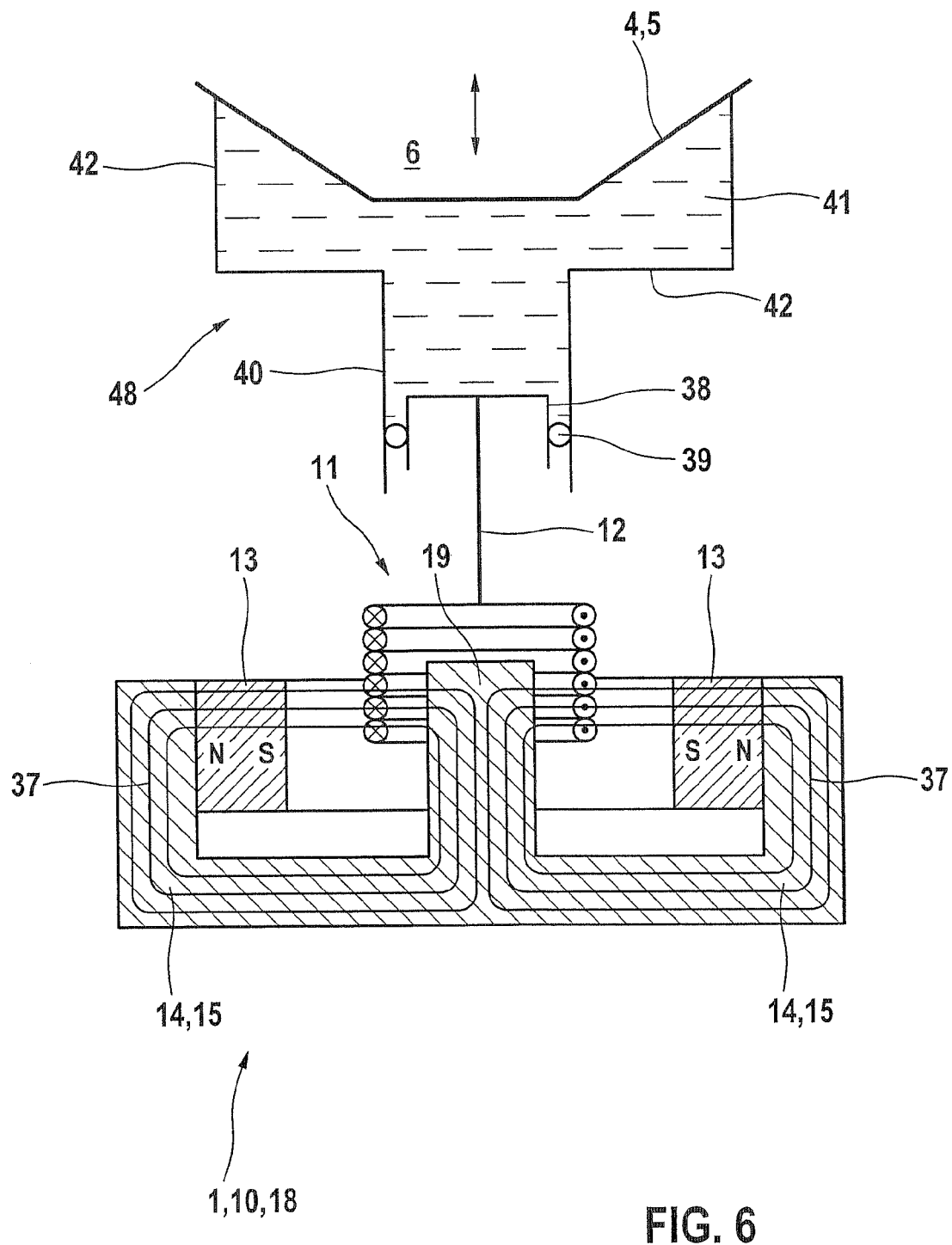
FIG. 6 is a schematic illustration of the mechanism for moving the work diaphragm, in a fourth exemplary embodiment.

The first exemplary embodiment, shown in FIG. 3, of the voice coil drive 18 for the work diaphragm 4 includes a permanent magnet 13, which generates a magnetic field, whose magnetic field lines 37 are shown only in FIG. 6. The magnetic field, generated by a permanent magnet 13 with a north pole N and a south pole S, is intensified by an iron core 14 or an iron part 15, and the magnetic flux is furthermore essentially concentrated in the iron core 14 or iron part 15. The iron core 14 also includes an iron core return 19, which is disposed partly inside a coil 11. The iron core 14 with the iron core return 19, the permanent magnet 13, and the coil 11 are rotationally symmetrical. The iron core return 19 serves to return the magnetic flux to inside the coil 11. An elastic element 31 embodied as a spring 32 is connected both to the coil 11 and to the iron core 14 as a stationary part 33 of the fluid delivery device 1. Preferably there is more than one spring 32. The coil 11 is connected mechanically to the work diaphragm 4 by means of the rod 12. The rod 12 is supported or in other words guided by a bearing 47 or in other words a guide. In the vicinity of the coil 11, the magnetic field lines 37 of the magnetic field generated by the permanent magnet 13 are approximately perpendicular to a longitudinal axis of the rod 12. As a result, when a current is passed through the coil 11, a Lorentz force occurs in the direction of the longitudinal axis of the rod 12. If a current in the opposite direction is passed through the coil 11, the result is a Lorentz force in the opposite direction along the axis of the rod 12 from the previous example. The passage of current through the coil 11 in alternating directions thus directly to the coil, generates a Lorentz force for moving the work diaphragm 4 in opposite directions in the direction of the axis of the rod 12. As a result, both in an intake stroke and in a compression stroke, the work diaphragm 4 can be moved solely by means of the Lorentz force generated in the coil 11. Advantageously, the magnitude of the Lorentz force is dependent on the current passed through the coil 11, so that the magnitude of the Lorentz force for moving the work diaphragm 4 can be controlled in a simple way, by passing a different current through the coil 11. The first exemplary embodiment shown in FIG. 3 can also be embodied without the springs 32 (FIG. 4). Moreover, the Lorentz force generated by the coil 11 is largely independent of the motion or stroke of the coil 11 in the magnetic field generated by the permanent magnet 13, because the motions and the stroke of the coil 11 are relatively slight, and thus the coil 11 is located in an essentially constant magnetic field. The Lorentz force acting on the work diaphragm 4 can thus be controlled simply, by controlling the current passed through the coil 11. The springs 32 serve in particular to guide or in other words support the coil 11.

Figure 5:
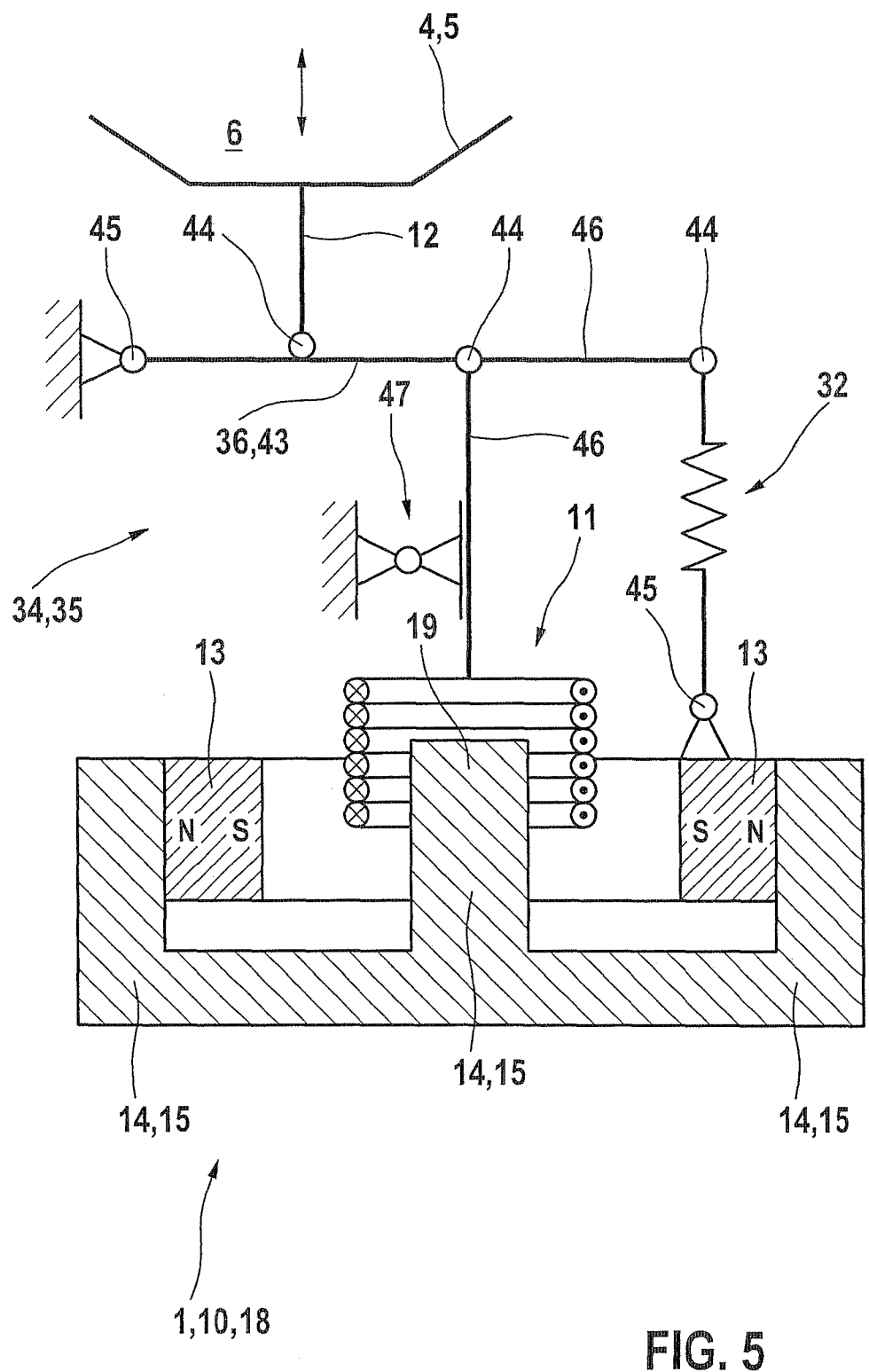
FIG. 5 is a schematic illustration of the mechanism for moving the work diaphragm, in a third exemplary embodiment.

In the third exemplary embodiment, shown in FIG. 5, the coil 11 is coupled mechanically to the work diaphragm 4 by means of a step-up device. Hereinafter, essentially only a mechanism 34 shown in FIG. 4 will be described for the stepped-up mechanical coupling of the coil 11 to the work diaphragm 4. Otherwise, the second exemplary embodiment of FIG. 5 is equivalent to the first and second exemplary embodiments of FIGS. 3 and 4. A mechanism 34 embodied as a lever mechanism 35 includes bars 46, which are connected to one another via joints 44. A first bar 46 is connected directly to the coil 11 and is supported and guided by the bearing 47. A second bar 46 is pivotally connected to this joint 44 and its end in turn has a joint 44 that is connected to the spring 32. The spring 32 is secured on one end to the permanent magnet 13 by means of a fixed joint 45. A leaf spring 36 or a lever 43 is connected on one end to a fixed joint 45. The other end of the leaf spring 36 or lever 43 is connected to an already-described joint 44. The rod 12 is mechanically attached centrally on the leaf spring 36 or lever 43, and the rod 12 is connected to the work diaphragm 4. The lever 43 is pivot able about the fixed joint 45. Upon a motion of the bar 46, which is connected directly to the coil 11, in the direction of a longitudinal axis of the bar 46 because of a Lorentz force generated in the coil 11, the joint 44, which is attached centrally to the lever 43, moves only half as far as the bar 46 moves in the direction of a longitudinal axis of the bar 46. In an additional embodiment of the lever 43 as a leaf spring 36, bending of the leaf spring 36 brings about an additional reduction in the motion of the leaf spring 36 at the joint 44 upon a motion of the rod 12. The motion of the coil 11 is thus coupled to the motion of the work diaphragm 4 in stepped-up fashion, by the mechanism 34. Thus it is also possible to use voice coil drives 18, whose strokes are longer than the requisite strokes of the work diaphragm 4. For example, the motion or stroke of the coil 11 is on the order of 5 mm, and the motion or stroke of the work diaphragm 4 amounts to approximately 2 mm.

In FIG. 6, a fourth exemplary embodiment for mechanically stepped-up coupling 48 of the coil 11 to the work diaphragm 4 is shown. Below, essentially only the differences from the first exemplary embodiment of FIG. 3 will be described. On the outside of the work diaphragm 4, that is, on the opposite side from the side of the work diaphragm 4 oriented toward the work chamber 6 (FIGS. 1 and 2), a container 41 with a container wall 42 is attached. The container 41 is completely filled with hydraulic fluid and is sealed off in fluid-tight fashion from the surroundings of the fluid delivery device 1. A cylinder 40 is attached to the container 41 and a piston 38 is supported in the cylinder 40. The piston 38 is sealed off from the cylinder 40 by a seal 39. The rod 12 is connected to the piston 38 and is connected in turn to the coil 11. The coil 11 is thus connected to the piston 38 by means of the rod 12. A Lorentz force generated in the coil 11 as described above causes a motion of the coil 11, which thus also causes a motion of the piston 28 in the cylinder 40. The area of the piston 38 that is disposed in the hydraulic oil is less than the area of the work diaphragm 4 that is disposed in the hydraulic oil. As a result, the length of the stroke of the piston 38 is greater than the length of the stroke of the work diaphragm 4. Thus both a compression stroke of the work diaphragm 4 by means of an overpressure in the container 41 and an intake stroke of the work diaphragm 4 by means of an under pressure in the container 41 can be attained by the piston 38. Advantageously, the work diaphragm 4 is loaded equally by the hydraulic oil, or in other words, a constant pressure is exerted on the work diaphragm 4.

In FIG. 7, the system 2 for feeding an exhaust gas posttreatment medium, such as a urea-water solution, into the exhaust line 21 is shown. The internal combustion engine 20 generates an exhaust gas, which is carried away through the exhaust line 21. There is also a catalytic converter, not shown, in the exhaust line 21, in the flow direction of the exhaust gas. To reduce the emission of pollution from the engine, which is embodied in particular as a Diesel engine, there is an injection valve 24 in the flow direction of the exhaust gas between the engine 20 and the catalytic converter, not shown. In a reservoir 22, there is a urea-water solution, which is carried by means of the fluid delivery device 1 through lines 23 to the injection valve 24. In the process, as a function of the quantity of exhaust gas flowing through the exhaust line 21, the injection valve 24 introduces the urea-water solution into the exhaust line 21. The quantity of the urea-water solution to be introduced may vary between zero and the maximum quantity per unit of time.

Figure 8:
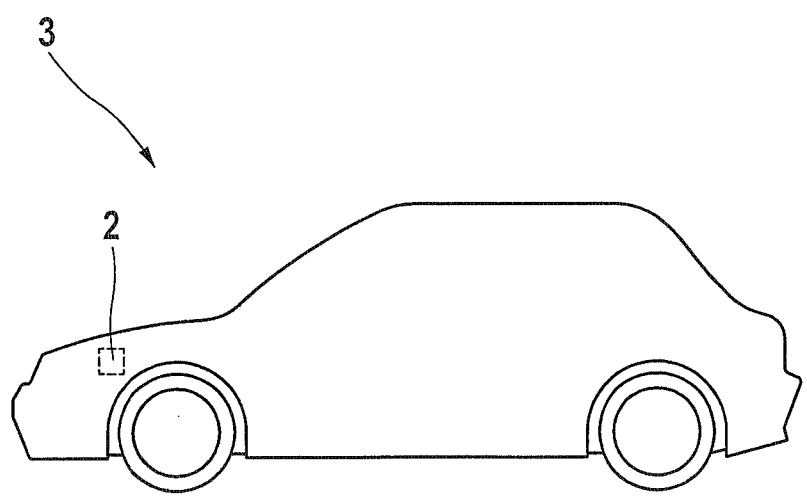
FIG. 8 is a highly schematic view of a motor vehicle.

In FIG. 8, a motor vehicle 3 having the system 2 is shown.

The details of the various exemplary embodiments can be combined with one another, as long as nothing to the contrary is mentioned.

Overall, substantial advantages are associated with the fluid delivery device 1 of the invention and the system 2 of the invention for feeding an exhaust gas posttreatment medium into the exhaust line 21 of the internal combustion engine 20. The work diaphragm 4 is driven by a voice coil drive 18, so that in a simple way, with only a few mechanical components, the work diaphragm 4 can be moved and the Lorentz force acting on the work diaphragm 4 in the intake stroke or the compression stroke is easily controlled, because it depends on the current passed through the coil 11. These advantageous properties are especially necessary when fluid delivery devices 1 are used in motor vehicles 3.

The foregoing relates to preferred exemplary embodiments of the invention, it being understood that other variants and embodiments thereof are possible within the spirit and scope of the invention, the latter being defined by the appended claims.

We claimed:

1. A fluid delivery device, in particular for delivering exhaust gas post treatment media, such as a urea-water solution, for an internal combustion engine, including:
   a movable work wall;
   a work chamber for a fluid that is to be delivered, the work chamber being capable of being increased and decreased in size by means of the movable work wall;
   at least one fluid connection for a fluid that is to be delivered; and
   a movable coil through which alternating current flows operatively connected to the work wall for moving the work wall upon an intake stroke and a compression stroke, the movable coil embodied such that a force for moving the work wall both in the intake stroke and in the compression stroke includes a Lorentz force,
   wherein the movable coil is connected to the movable work wall by a coupling configured to reduce the motion of the work wall relative to the motion of the coil so that the movement of the work wall is less than the movement of the coil.

2. The fluid delivery device as defined by claim 1, wherein the force for moving the work wall both in the intake stroke and in the compression stroke is solely the Lorentz force.

3. The fluid delivery device as defined by claim 1, wherein the coil is disposed in a magnetic field generated by a permanent magnet.

4. The fluid delivery device as defined by claim 3, wherein the magnetic field generated by the permanent magnet is passed through an iron part in the form of an iron return for concentrating the magnetic flux.

5. The fluid delivery device as defined by claim 1, wherein the movable coil is connected to at least one elastic element and the at least one elastic element is connected to the movable coil and to a stationary part of the fluid delivery device.

6. The fluid delivery device as defined by claim 1, wherein the coil is mechanically coupled to the work wall.

7. The fluid delivery device as defined by claim 1, wherein the coil is coupled hydraulically to the at least one work wall.

8. The fluid delivery device as defined by claim 1, wherein the coil is coupled to the at least one work wall by a lever mechanism.

9. The fluid delivery device as defined by claim 1, wherein the coil is coupled to the work wall by means of a spring.

10. The fluid delivery device as defined by claim 1, wherein the fluid delivery device includes a first fluid connection to the work chamber having a first valve for introducing the fluid into the work chamber and a second fluid connection to the work chamber having a second valve for carrying the fluid out of the work chamber.

11. The fluid delivery device as defined by claim 1, wherein the work wall at least partly comprises plastic.

12. A system for feeding an exhaust gas post treatment medium, such as a urea-water solution, into an exhaust line of an internal combustion engine, including:
   an injection valve for introducing the exhaust gas post treatment medium into the exhaust line;
   a reservoir for the exhaust gas post treatment medium;
   a fluid delivery device; and
   at least one line for carrying the exhaust gas post treatment medium from the reservoir into the exhaust line by means of the fluid delivery device, wherein the fluid delivery device is embodied as defined by claim 1.

13. A motor vehicle including a system for feeding an exhaust gas post treatment medium as defined by claim 12.

14. A motor vehicle including a fluid delivery device as defined by claim 1.

15. A fluid delivery device, in particular for delivering exhaust gas post treatment media, such as a urea-water solution, for an internal combustion engine, including:
   a movable work wall;
   a work chamber for a fluid that is to be delivered, the work chamber being capable of being increased and decreased in size by means of the movable work wall;
   at least one fluid connection for a fluid that is to be delivered; and
   a movable coil through which alternating current flows operatively connected to the work wall for moving the work wall upon an intake stroke and a compression stroke, the movable coil embodied such that a force for moving the work wall both in the intake stroke and in the compression stroke includes a Lorentz force,
   wherein the movable coil is indirectly mechanically connected to the movable work wall by a lever mechanism so that the motion of the movable work wall is different from the motion of the movable coil; and
   wherein the lever mechanism includes;
   a lever pivotably mounted to a stationary part of the device and connected to the work wall and the moving coil; and
   a spring connected between the lever and a stationary part of the device.

16. The fluid delivery device as defined by claim 15, wherein the corresponding connections of the work wall and the moving coil to the lever are offset relative to each other.

17. The fluid delivery device as defined in claim 16, wherein the connection of the spring to the lever is offset relative to the corresponding connections of the work wall and the moving coil.

18. The fluid delivery device as defined by claim 17, wherein corresponding connections of the work wall and the moving coil are between the pivotable mount and the connection of the spring to the lever.

19. A fluid delivery device, in particular for delivering exhaust gas post treatment media, such as a urea-water solution, for an internal combustion engine, comprising:
   a movable work wall;
   a work chamber for a fluid that is to be delivered, the work chamber being capable of being increased and decreased in size by means of the movable work wall;
   at least one fluid connection for a fluid that is to be delivered; and
   a movable coil through which alternating current flows operatively connected to the work wall for moving the work wall upon an intake stroke and a compression stroke, the movable coil embodied such that a force for moving the work wall both in the intake stroke and in the compression stroke includes a Lorentz force,
   wherein the movable coil is indirectly mechanically connected to the movable work wall by a mechanism so that the motion of the movable work wall is different from the motion of the movable coil, and
   wherein the mechanism includes a spring connected between the mechanism and a stationary part of the device, the spring being connected to the mechanism at a location offset from the axis of the movable coil.

20. A fluid delivery device in particular for delivering exhaust gas post treatment media, such as a urea-water solution, for an internal combustion engine, comprising:
- a movable work wall;
- a work chamber for a fluid that is to be delivered, the work chamber being capable of being increased and decreased in size by means of the movable work wall;
- at least one fluid connection for a fluid that is to be delivered; and
- a movable coil through which alternating current flows operatively connected to the work wall for moving the work wall upon an intake stroke and a compression stroke, the movable coil embodied such that a force for moving the work wall both in the intake stroke and in the compression stroke includes a Lorentz force,
- wherein the movable coil is indirectly mechanically connected to the movable work wall by a mechanism including a leaf spring connected to the work wall and the moving coil so that the motion of the movable work wall is different from the motion of the movable coil.

21. The fluid delivery device as defined by claim 20, wherein the leaf spring is pivotably mounted to a stationary part of the device.

\* \* \* \* \*